(12) United States Patent
Sherman et al.

(10) Patent No.: US 6,945,743 B2
(45) Date of Patent: Sep. 20, 2005

(54) SPORTS AND RECREATIONAL TRAILER

(76) Inventors: Jeffrey Jon Sherman, 8802 51st St. NW., Annandale, MN (US) 55302; Timothy Halonen, 14224 85th St. SW., Cokato, MN (US) 55321

( * ) Notice: Subject to any disclaimer, the term of this patent is extended or adjusted under 35 U.S.C. 154(b) by 351 days.

(21) Appl. No.: 10/202,720

(22) Filed: Jul. 24, 2002

(65) Prior Publication Data

US 2004/0018075 A1 Jan. 29, 2004

(51) Int. Cl.$^7$ .................................................. B60P 1/04
(52) U.S. Cl. ....................................................... 414/476
(58) Field of Search ............................... 414/476, 474, 414/467; 182/63.1, 69.5; 280/90.1

(56) References Cited

U.S. PATENT DOCUMENTS

| | | | |
|---|---|---|---|
| 444,919 A | * 1/1891 | Fukher | 182/63.1 |
| 3,289,787 A | * 12/1966 | McSwain | 182/69.5 |
| 3,473,627 A | * 10/1969 | Repka | 182/69.5 |
| 4,456,272 A | 6/1984 | Kroeger | |
| 4,723,371 A | 2/1988 | Williams | |
| 5,295,555 A | 3/1994 | Strange | |
| 5,366,336 A | * 11/1994 | Friesen et al. | 414/476 |
| 5,749,387 A | 5/1998 | Thompson | |
| 5,918,615 A | 7/1999 | Stuck, Sr. | |
| 6,009,673 A | 1/2000 | Adams | |
| 6,155,279 A | 12/2000 | Humphrey | |
| 6,460,653 B1 | * 10/2002 | Hardy et al. | 182/63.1 |
| 2002/0134620 A1 | * 9/2002 | Meyer | 182/63.1 |

* cited by examiner

Primary Examiner—Emmanuel Marcelo
(74) Attorney, Agent, or Firm—Roy, Kiesel, Keegan & DeNicola; Neil J. Coig

(57) ABSTRACT

The sports and recreational trailer fills the existing gap in technology by providing a single device to competently handle all of the tasks associated with elevated stands, blinds, trailers, fishing huts, and the like. This invention also adds new functionality not before seen in any incarnation of the above devices, such as the ability to lower the entire chassis, or to load the trailer by utilizing a bed-tilting feature.

13 Claims, 6 Drawing Sheets

SPORTS AND RECREATIONAL TRAILER

BACKGROUND OF THE INVENTION

The present invention relates to the field of hunting and recreation, including still hunting, ice fishing and other forms of sportsman's activities. Currently, many different tools and apparatus need to be utilized if a sportsman desires to still hunt from a blind, still hunt from a stand, ice fish and tow equipment related to such activities. Many, if not all, of these devices as individual components are bulky and cumbersome. Because of this, to buy, store and maintain such a multitude of devices is a cumbersome, not to mention expensive, prospect.

Present devices offer some of the functionality of the present invention, but none offer all of the versatility or the combination of features that the sports and recreational trailer presented herein does. Some elevating stands offer storage for ATV's, but do not provide the ability to hunt from a ground blind position. Ice fishing huts in the present art do not offer the mobility that the current invention does. Available incarnations of ground blinds generally are not self-elevating. Nothing in the present field offers the ability to combine all of these features, or offers the additional novel aspects of the present invention, such as a dropping hitch and axle assembly.

The current invention fills the existing gap in technology by providing a single device to competently handle all of the tasks associated with the separate devices listed above. This invention also adds new functionality not before seen in any incarnation of the above devices, such as the ability to lower the entire chassis, or to load the trailer by utilizing a bed-tilting feature.

OBJECTS OF THE INVENTION

One object of the invention is to provide a device capable of providing shelter for blind hunting.

Another object of this invention is to provide a device capable of providing an elevated stand for still hunting and other activities which require a heightened position.

Still another object of the invention is to supply a device which provides shelter for ice fishing and other activities where shelter from weather elements is required.

Still another object of the invention is to provide a device that facilitates entry and exit by lowering the load floor to be parallel and flush with the ground below it.

Still another object of the invention is to provide a device that enables the user to carry cargo in the device when being transported to and from the destination.

Other objects and advantages of this invention shall become apparent from the ensuing descriptions of the invention.

SUMMARY OF THE INVENTION

According to the present invention, the sports and recreational trailer is a multi-purpose device that may be used for myriad uses, including but not limited to hunting, fishing, observation, hauling and elevated work. It comprises mainly a chassis portion and a platform portion. The platform portion can be positioned at various elevations, ranging from flush with the ground to a substantial height, depending upon the desired use of the trailer. Various other features permit the trailer to be entirely or partially enclosed so that the user can be shielded from weather, to prevent game from scenting the hunter/user within, as well as other uses which shall become apparent. Other components of the invention permit the entire trailer to be put in substantial contact with the ground below.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Figure 1:
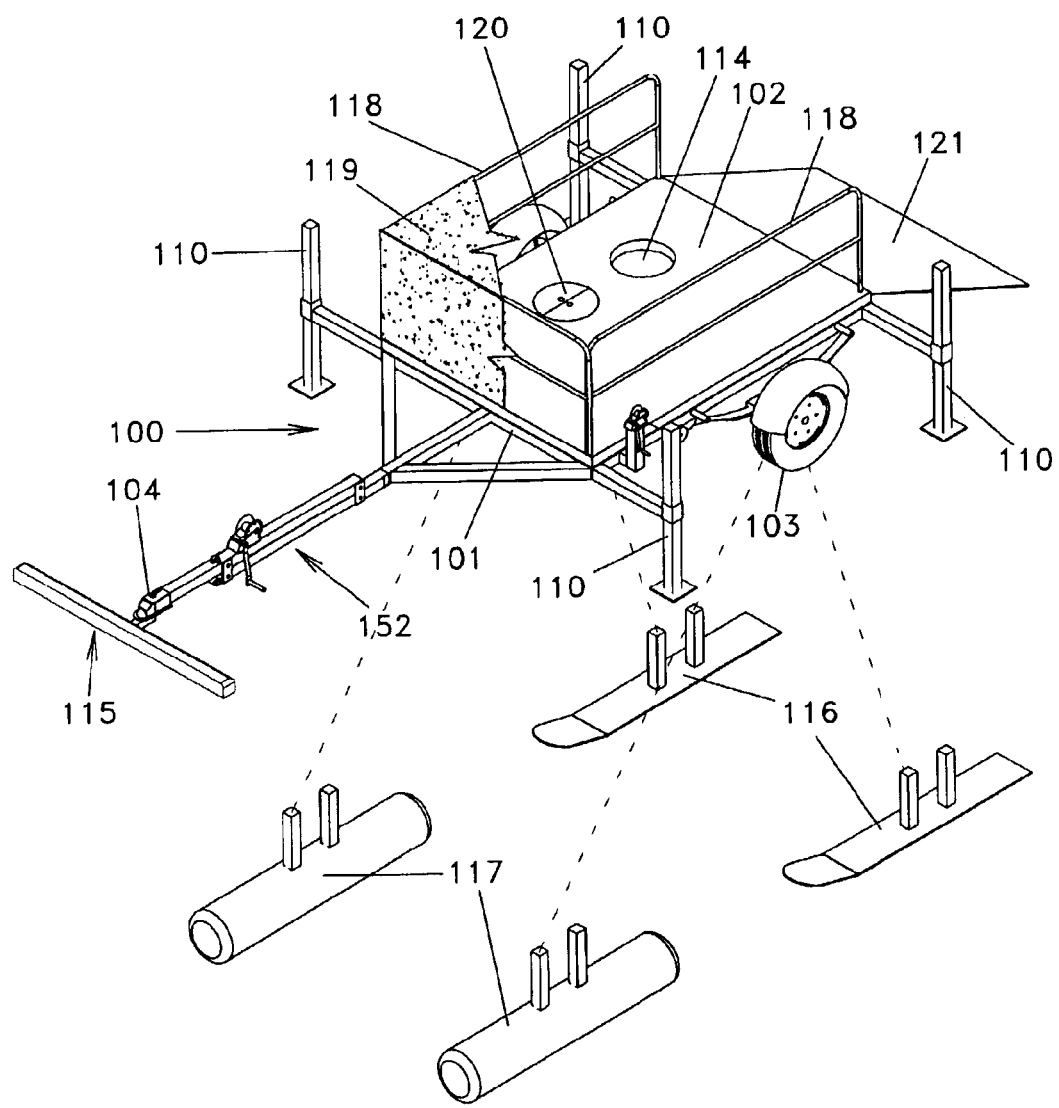
FIG. 1 shows a perspective view of the sports and recreational trailer.
Figure 2A:
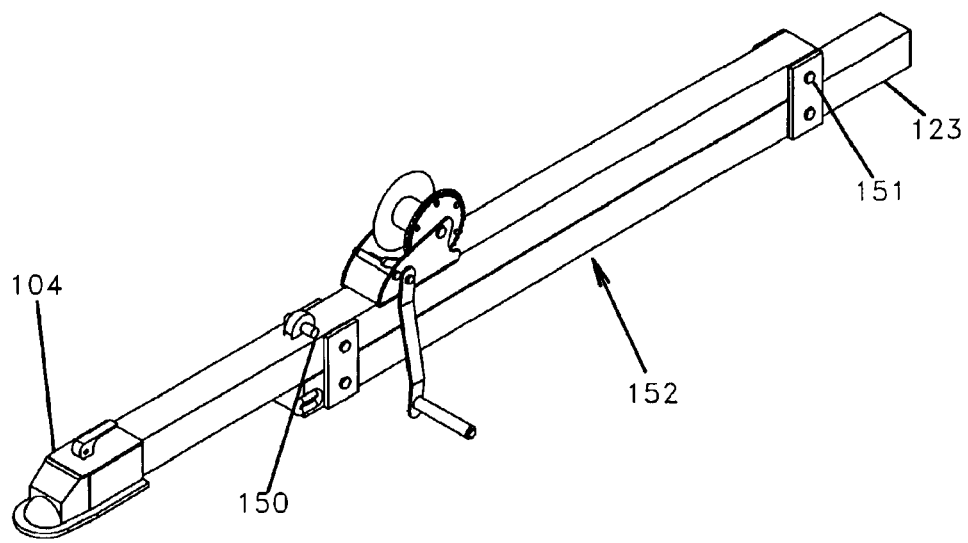
FIG. 2A shows a perspective view of the drop hitch assembly in the "up" position.
Figure 2B:
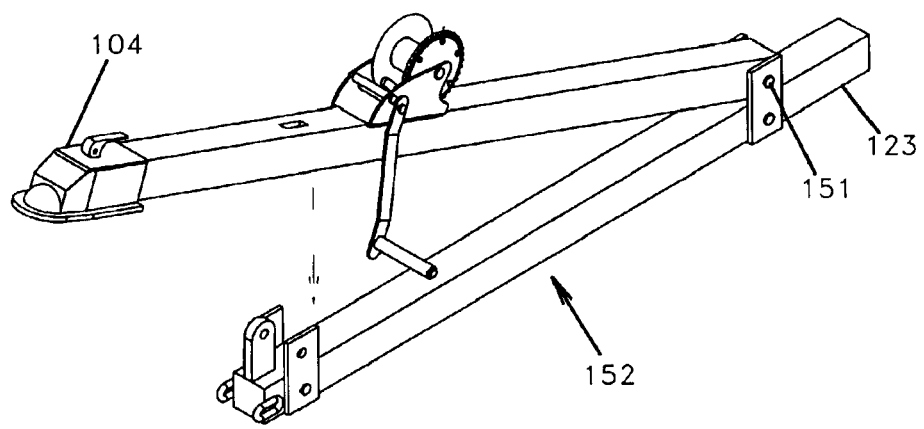
FIG. 2B shows a perspective view of the drop hitch assembly in the "down" position.
Figure 3A:
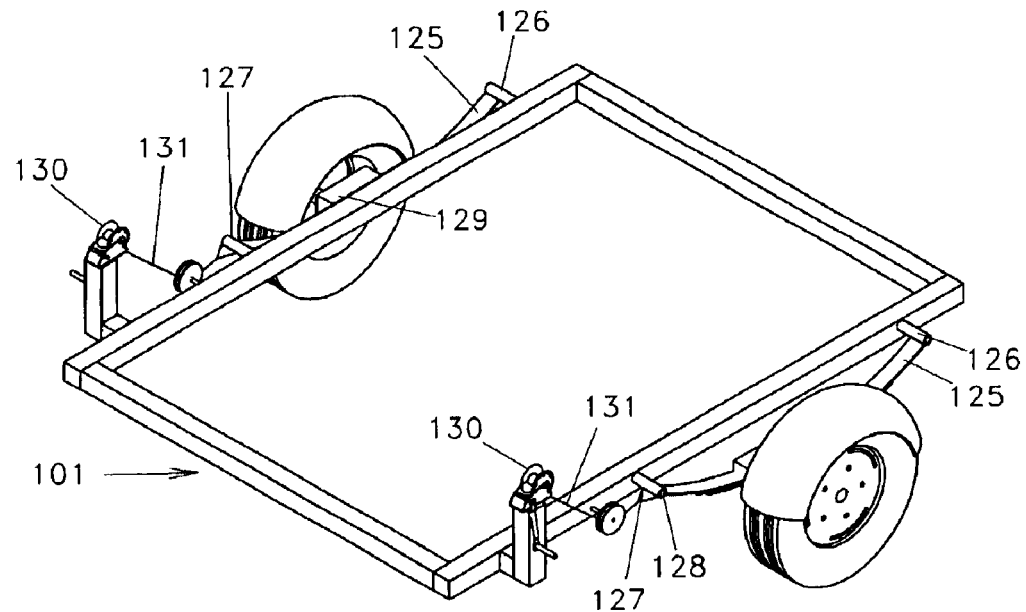
FIG. 3A shows a perspective view of the drop axle assembly in the "up" position.
Figure 3B:
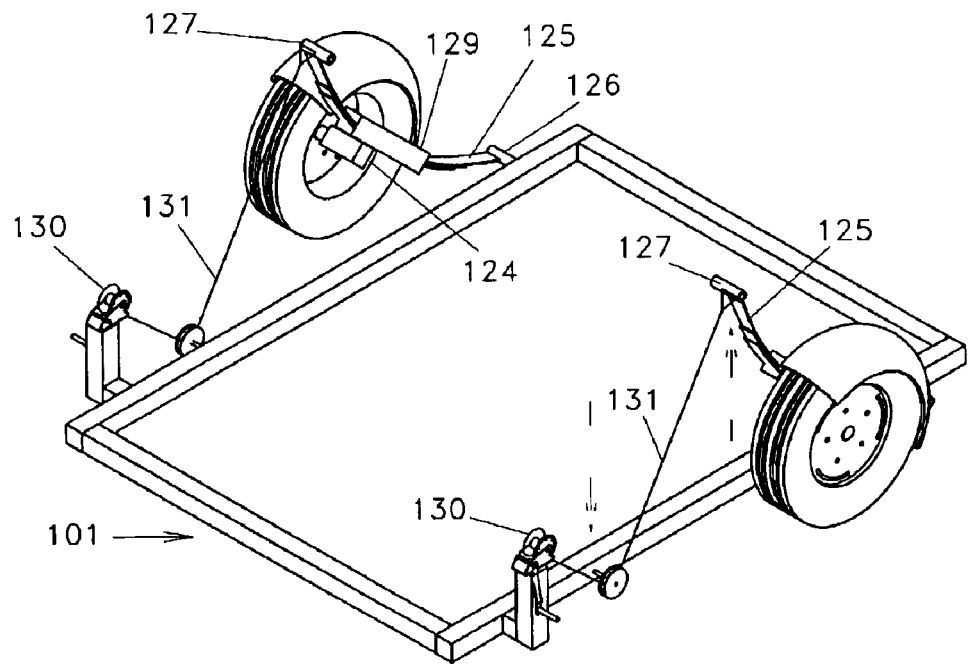
FIG. 3B shows a perspective view of the drop axle assembly in the "down" position.
Figure 4A:
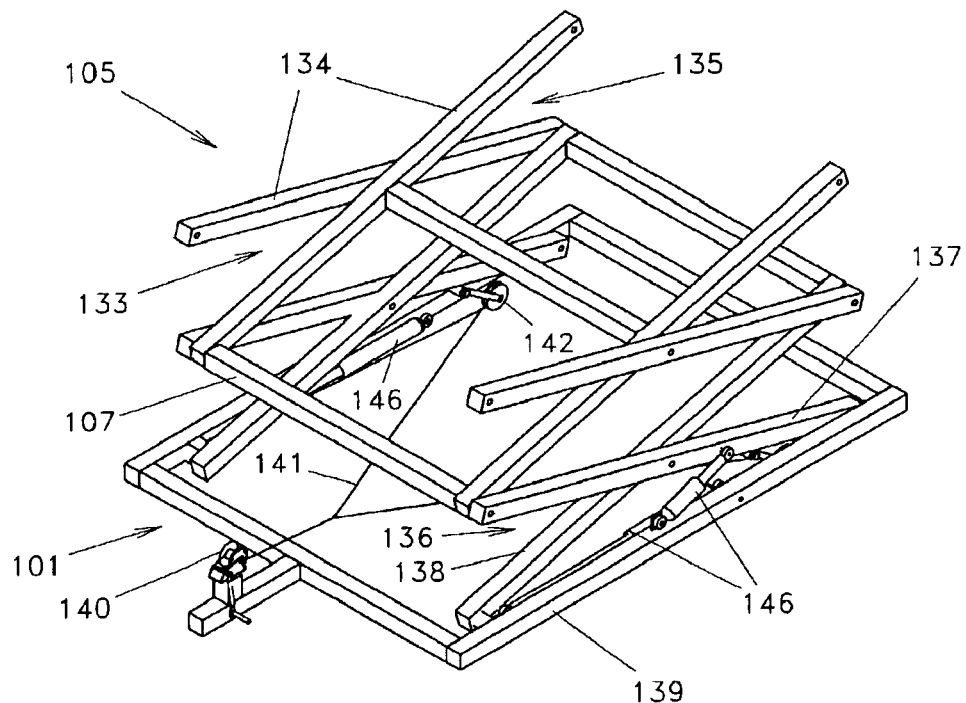
"FIG 4A. Shows a perspective view of the elevating assembly.
Figure 4B:
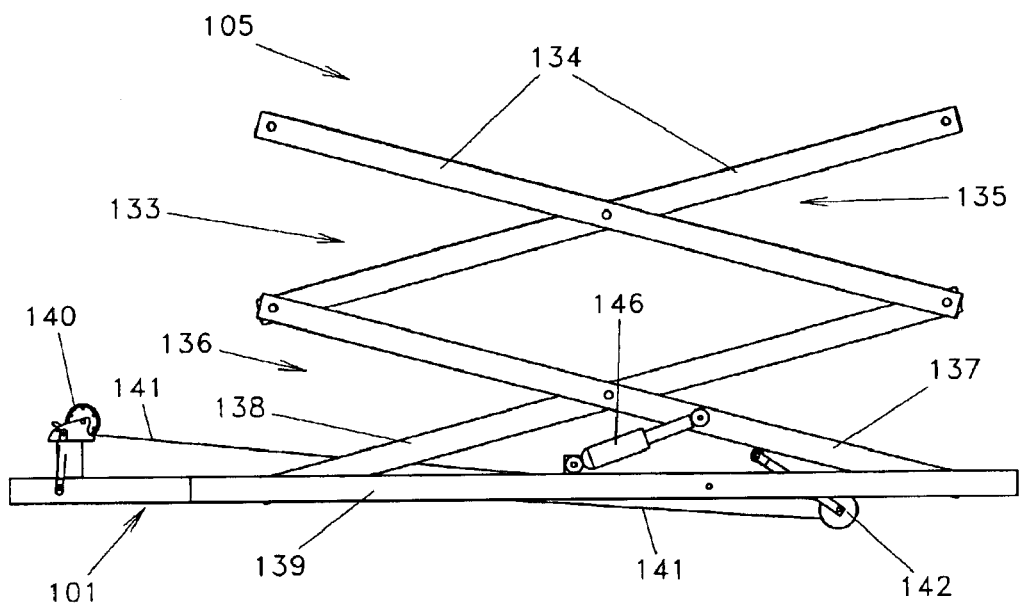
FIG 4B. Shows a side view of the elevating assembly."

Without any intent to limit the scope of this invention, reference is made to the figures in describing the various embodiments of the invention. Referring to FIGS. 1 through 4, a sports and recreational trailer 100, chassis 101 can support platform 102, in a number of ways. One such way is directly, i.e. is permanently affixed to chassis 101. Another method is an elevational connection, that is, a platform that is able to be lifted up relative to chassis 101, which will be discussed in greater detail below. Other modes of connectivity would be possible as well, and evident to those skilled in the art.

Chassis 101 would likely be mobile in most applications, to provide added convenience and utility. Mobility can be achieved by attaching various mobility-enabling devices such as wheels 103 for general utility, skids 116 if in a more arctic climate or even buoyant devices, such as pontoon floats 117 if in an aquatic environment. Part of trailer's 100 mobility is being able to be affixed to a towing vehicle 115, such as a car, truck, snowmobile or all-terrain vehicle (ATV) via hitch 104. The trailer 100 could also conceivably be self-propelled if desired.

Figure 5:
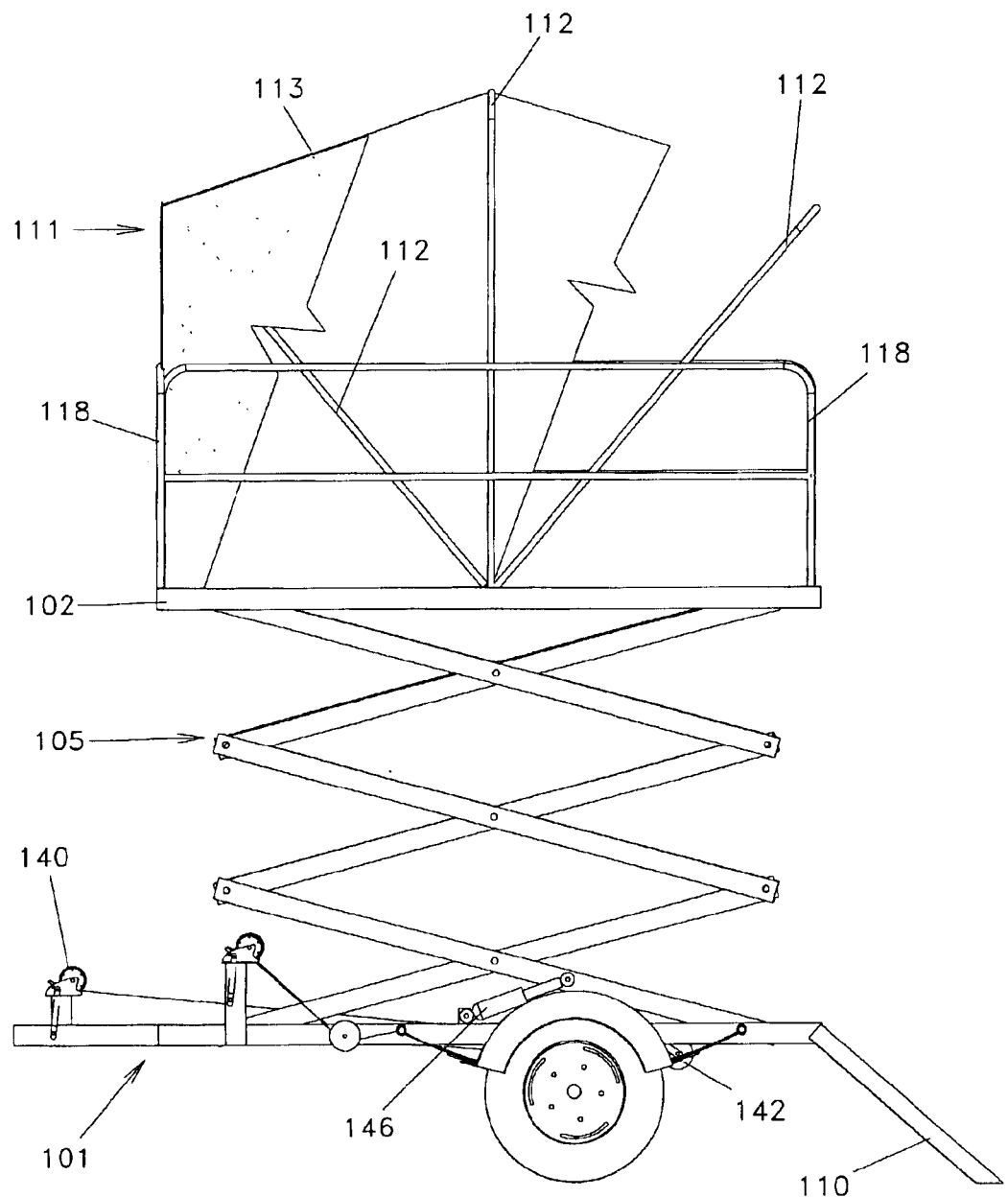
FIG. 5 shows an elevational view of the sports and recreational trailer in the elevated position.

If trailer 100 is in a configuration by which platform 102 is able to be elevated, additional parts will be configured as part of trailer 100. One such part would be lift 105, which can be attached to platform 102 and to chassis 101. Using lift 105, platform 102 may be elevated as illustrated in FIG. 5. Such lift 105 would be comprised mainly of linkage 133 attached to chassis 101. Linkage 133 would comprise a series of crossed bars 134, each forming a section 135, with the overall number of sections 135 dependent upon the desired maximum height of the device, as well as other factors which may warrant additional sections 135. Examples of such varying needs include increased weight capacity or space constraints, such as the need for a shorter trailer. First leg 137 of first section 136 of linkage 133 would be pivotally attached to a fixed point of chassis 101. Second leg 138 would be slidably attached to chassis 101 by way of channel 139, which would permit lateral movement of second leg 138. Such lateral movement is necessary to facilitate the elevation of platform 102. Horizontal braces 107 may also be utilized to provide additional stability and weight capacity. Other types of lifting mechanisms could also be used, but this particular iteration permits platform 102 to remain flat when in the down position, substantially parallel to chassis 101. This enables efficient use of space and minimal intrusion of lift 105 and platform 102 when in the stowed, or down position, as well as permitting platform 102 to be used for storage when in the down position, rather than occupying space on the trailer, as other devices in the art do.

To counteract any torquing forces that may result from the higher center of gravity when elevated, chassis 101 may be outfitted with stabilizers 110. These may be mounted in several ways, and in several configurations, one of which is pictured in FIG. 5. In this particular embodiment, stabilizers 110 are attached to the rear and/or front of chassis 101 and rotate down to engage the ground below when needed. Stabilizers 110 can take various forms, such as that listed here, as well as telescoping bars that extend out of the box steel forming chassis 101, as in FIG. 1, or any other out rigging device that could prevent rotational motion of trailer 100.

Platform 102 may also be equipped with various other accoutrements to facilitate activities on trailer 100. One such example would be collapsible shelter 111, which may be used during hunting or fishing, among other things, for protection from weather. Collapsible shelter 111 would comprise structural ribs 112 that support material 113 such as canvas, nylon, plastic or the like, forming collapsible shelter 111. Alternately, railing 118 can be employed about the perimeter of platform 102. Railing 118 can be used to retain objects within trailer 100 or to support concealing mesh 119 or other material, and need not be permanently attached to platform 102. Concealing mesh 119 can be used to prevent game from spotting the user of trailer 100 and/or as shelter from the weather when affixed to railing 118 or collapsible shelter 111.

In addition, platform 102 may have opening(s) 114 in strategically placed positions on the floor to permit access to the ground below. This enables users of trailer 100 to access the surface below for activities like ice fishing, where access to the ground is required. Openings 114 can be used with doors 120 so that openings might not always be exposed and objects pass therethrough.

Platform 102 may also be configured to permit its rotation about wheels 103 by being releasably attached to hitch 104. In this manner, platform 102 can be permitted to tilt until it contacts the ground. This precludes the need for a ramp for loading snowmobiles, ATV's or similar items. Ramp 121 can be utilized, if desired, which doubles as a retaining device to keep loaded items within trailer 100 when ramp 121 is closed.

Figure 6:
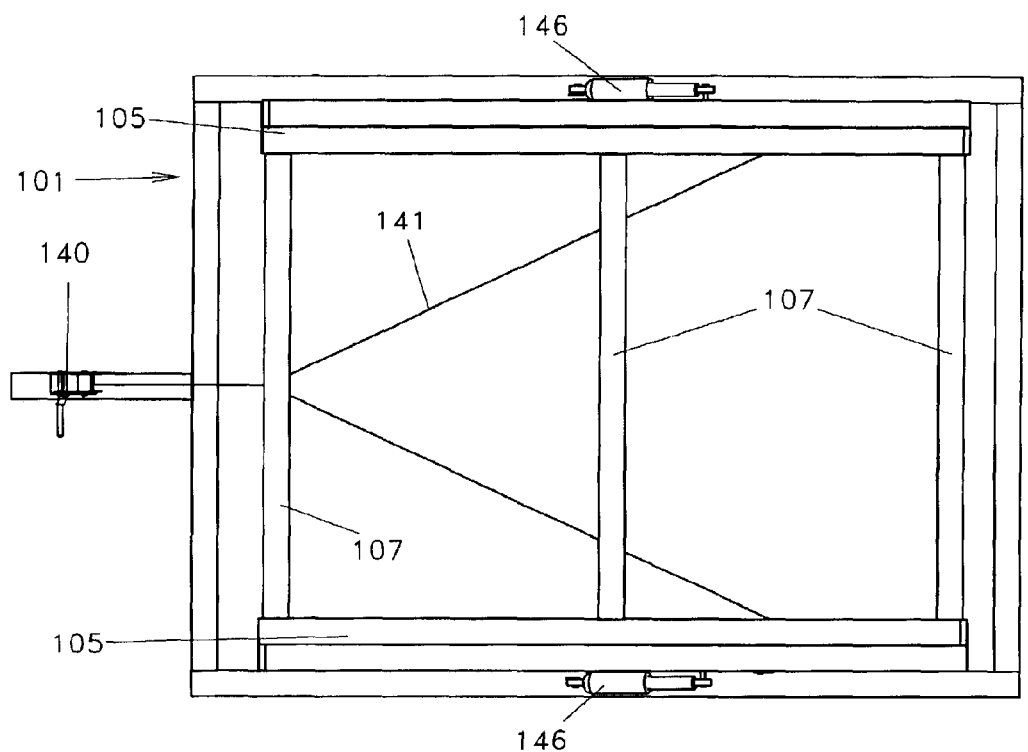
FIG. 6 shows a top view of the lifting mechanism.

Dropping hitch assembly 152 may be configured to permit trailer 100 to raise and lower independently of the hitch 104. This is accomplished by having tongue 123 from trailer 100 connected to another piece which attaches to the towing vehicle. The two can be connected in multiple ways, one of which is in a hinged fashion as illustrated in FIG. 6. This configuration has pivot 151 whereby hitch 104 remains stationary and tongue 123 moves downward, permitting trailer 100 to rest flat on the ground when axles 122 are also disengaged.

Axle 122 may be constructed in various ways to permit trailer 100 to be lowered and put in substantial contact with the ground beneath it. One method is to have stub axle 124 connected to suspension component 129, such as leaf spring 125 or similar device, which would be hinged at rear point 126, and front point 127 would be detachable. It should be noted that this could be configured in the reverse, namely that front point 127 could be hinged, while rear point 126 could be detachable, however in the pictured embodiment, the former method was chosen. In either case, while in the up position, as pictured in FIG. 3A, axle pin 128 can be employed to hold suspension component 129 in place. Also part of this assembly would be suspension winch 130 with cable 131 that would be used to raise and lower the detachable point of suspension component 129. This procedure is outlined in greater detail below.

In operation, hitch 104 and trailer 100 can remain in the standard position, or lowered in order to be flush with the ground. If the latter is desired, hitch 104 and trailer 100 must be lowered, though not necessarily in that order. Dropping hitch assembly 152 can be lowered by removing axle hitch pin 150. This permits the front end of the trailer to move toward the surface below it, while hitch 104 remains attached to towing vehicle 115. The second step of lowering trailer 101 is to disengage the axles 122. This is achieved by removing axle pin(s) 128 and actuating suspension winch 130 such that the cable 131 would be released, which allows detachable front point 127 of the suspension component 129 to move upwards, and, in turn, trailer 100 moves downward toward the surface below it under trailer's 100 own weight. Once this procedure is complete, trailer 100 is once again level and ready for use.

As previously mentioned, trailer 100 can be used in various activities. In operation as a ground blind, trailer 100 would first be positioned in the desired spot. If desired, trailer may be lowered by disengaging hitch 104 and axle 122. Railing 118 can then be installed, if not fixed, and concealing mesh 119 may be arranged to provide optimal coverage. User may then engage in the desired activity, such as predator calling, observation, hunting or the like.

In operation as an elevated stand, again, trailer 100 will be positioned where desired, and can then be lowered using axle 122 and hitch 104. Alternately, stabilizers 110 can be used if the user does not wish to lower trailer 100. Lift 105 may then be employed to raise platform 102. In order to do this, an upward force must be applied to platform 102. On such method of accomplishing this would be to utilize winch 140, which can be either manual or motorized, to draw in cable 141 or other strand-like material which is attached to second leg 138 by way of pulley 142. Pulley 142 can also be attached to lifting bar 143, which consists of a bar 144 and roller 145. Winch 140 is actuated, which causes lifting bar 143 to rotate, and as this occurs, whereby roller 145 moves along first leg 137 of linkage 133. As lifting bar 143 rotates the vertical position of roller 145 moves upward, taking with it first leg 137. Once lifting bar 143 is in a substantially vertical position lifting bar 143 is mechanically prohibited from further torquing, thus the pulling force from cable 141 on pulley 142 transfers to second leg 138 of lift 105. This force slides second leg 138 along channel 139 toward the end of trailer 100, in turn causing lift 105 to further elevate platform 102. To aid in the elevating action, compressible mounts 146 may be employed to assist in providing the requisite upward force by attaching them to the lift 105 and to chassis 101. Once elevated to the desired height, user may then perform the desired activity, such as hunt, practice shoot, paint or the like.

In operation as an ice fishing hut, trailer 100 will likely be located on a frozen body of water where fishing is desired. Axle 122 and hitch 104 may then be lowered, thus putting chassis 101 in direct contact with the ground below. Doors 120 to openings 114 may then be opened to access the ice below in order to fish.

In operation as a utility trailer, ramp 121 may be used to load wheeled or other mobile devices onto trailer 100, or items can be stored behind railing 118. Trailer 100 could then be towed normally, used to lift or lower loaded items, or various other activities as previously described.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention claimed is:

1. A sports and recreational trailer comprising a mobile chassis comprising
   a. a suspension component having at least one axle attached thereto, wherein said suspension component is attached to said chassis at least a first point and a second point, wherein at least one of said first point and said second point are connected to said chassis via a releasable connection;
   b. a tongue and a hitch configured to be attached to a vehicle, wherein said hitch is pivotally attached to said tongue and having a second releasable connection to said tongue,
   c. a platform operatively attached to said chassis in a substantially parallel orientation to a weight-bearing surface;
   d. a lifting mechanism configured to elevate and lower said platform relative to said chassis; and
   e. a shelter assembly operatively affixed to said platform and having at least one opening.

2. The sports and recreational trailer of claim 1 wherein at least one of said openings is a door.

3. The sports and recreational trailer of claim 1 wherein at least one of said openings is a hatch in said platform to access the ground beneath said trailer.

4. The sports and recreational trailer of claim 3 further comprising stabilizers operatively attached to said chassis.

5. The sports and recreation trailer of claim 4 further comprising a railing operatively affixed to said platform.

6. The sports and recreational trailer of claim 5 wherein said shelter assembly is collapsible.

7. The sports and recreation trailer of claim 6 further comprising buoyant devices configured to maintain horizontal stability of said trailer in water or other aqueous environment.

8. The sports and recreational trailer of claim 1 further comprising a shelter assembly operatively affixed to said platform.

9. The sports and recreational trailer of claim 8 wherein said shelter assembly is collapsible.

10. The sports and recreation trailer of claim 9 wherein at least one of said openings is a hatch in said platform.

11. The sports and recreational trailer of claim 1 wherein said chassis is configured to rotate about said axle whereby either end of said chassis can be placed in operative contact with a weight-bearing surface.

12. The sports and recreation trailer of claim 1 further comprising buoyant devices configured to maintain horizontal stability of said trailer in water or other aqueous environment.

13. The method of using the sports and recreation trailer of claim 1 comprising the steps of moving said sports and recreation trailer to a desired location, and lowering said chassis by partially disengaging said axle from said chassis and partially disengaging said hitch from said chassis such that it is substantially flush and parallel to said weight bearing surface.

* * * * *